March 29, 1960  L. F. COFFIN, JR  2,930,918
HIGH DAMPING TWISTED WIRE
Filed Oct. 16, 1957
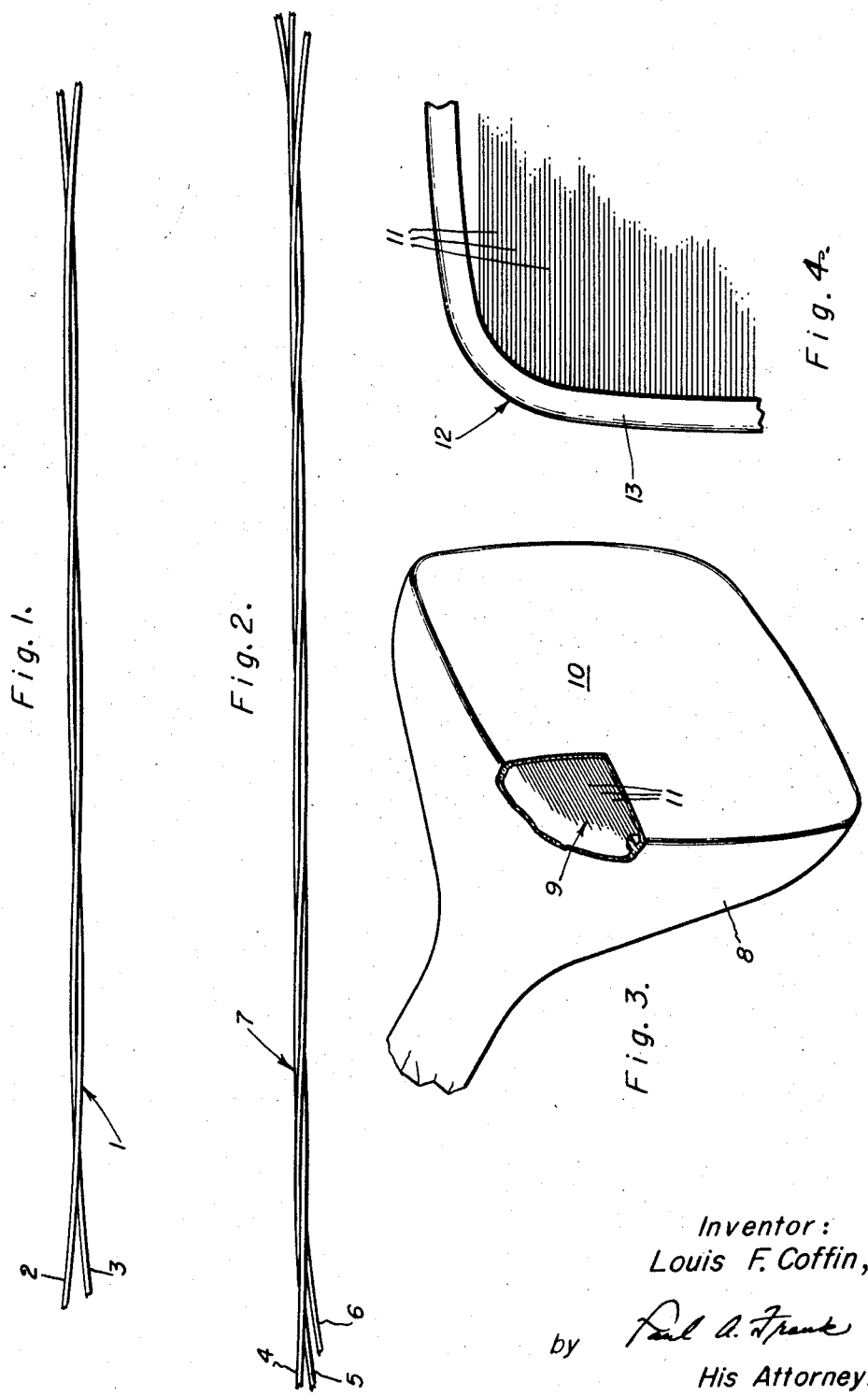
Inventor:
Louis F. Coffin, Jr.,
by
His Attorney.

United States Patent Office 2,930,918
Patented Mar. 29, 1960

2,930,918

HIGH DAMPING TWISTED WIRE

Louis F. Coffin, Jr., Schenectady, N.Y., assignor to General Electric Company, a corporation of New York Application October 16, 1957, Serial No. 690,522

6 Claims. (Cl. 313—83)

This invention relates to twisted wire having high vibration damping characteristics and more particularly to a grid-like structure of said wire as employed in color kinescope.

Color cathode ray tubes or kinescopes for television receivers may employ a unidirectional grid of closely-spaced wires within the tube and behind the screen to provide a mask for those types of color kinescopes which utilize post-acceleration or electron deflection principles. The grid wire of the typical mask may have upwards of some 400 or more wires arranged at spacings of the order of 25 to 32 mils. The individual wire diameter may vary from 2 to 5 mils with each grid being composed of wires of similar size. The individual wires of this grid are placed under a predetermined substantial tension or tensile stress and it is therefore understandable that such wires are exceptionally prone to both mechanical and electrical forces which induce vibration. Such vibrations are greatly increased in a cathode ray tube under vacuum conditions, for it is well known that air is an inherently good vibration damping medium. Since these wires or grids have the unfortunate characteristic of undergoing excessive vibration as a result of handling or excitation from stray sources during operation, damage to the grid itself or distortion of the color pattern has been experienced.

Accordingly, it is an object of this invention to provide vibration damping or color kinescope grids.

It is a further object of this invention to provide damping for color kinescope grid wires without substantially increasing the overall wire diameter.

It is another object of this invention to provide vibration damping in a grid wire by utilizing both material and rubbing friction damping.

The features of this invention which are believed to be novel are set forth with particularity in the appended claims. The invention itself, however, both as to its organization and method of operation, together with further objects and advantages thereof, may best be understood by reference to the following description when taken in connection with the accompanying drawing, wherein:

Fig. 1 illustrates a single wire of a grid comprising two very small twisted wire strands;

Fig. 2 illustrates an embodiment of the invention as disclosed in Fig. 1 in showing a three-strand twisted wire for a unidirectional grid;

Fig. 3 is a perspective view of a color TV tube utilizing a unidirectional wire grid within the tube adjacent the screen surface; and Fig. 4 discloses a unidirectional wire grid assembly which may be inserted in the tube of Fig. 1.

For the purposes of this description, internal damping may be ascribed to two methods: material damping and rubbing friction damping. Material damping generally relates to the internal energy loss in a body subjected to alternating stresses. Such a body may resist vibration due to the shape, size or structure of the individual crystals, their lattice arrangement, and other internal properties. For example, materials of high material damping may include lead and cast iron, as opposed to high strength low damping material, such as spring steel. Rubbing friction damping is generated through the rubbing action or relative displacement between two vibrating bodies and the frictional energy so developed is generated at the expense of vibrational energy.

Air damping is by far the most important factor in damping vibrations of fine wires. In high vacuums, material damping alone is insufficient to prevent excessive and objectionable vibrations and additional means of damping are required.

Referring now to Fig. 1, there is disclosed a method of incorporatign rubbing friction damping and material damping by employing a wire 1 consisting of two wire strands 2 and 3 of dissimilar metal which when externally joined in inter-engaging helices of a predetermined number of turns per inch presents satisfactory high damping qualities. It is understood that if these wire strands were each of the same metal and of the same physical properties, there would be little, if any, rubbing friction generated since the two strands would tend to vibrate in unison according to their natural periods of vibration, and therefore, there would be little, if any, relative longitudinal motion between the two strands. If the individual strands utilized are of dissimilar metal and the twisted strands are then stretched to produce the same strain, each individual strand will have a natural frequency of vibration which is proportional to the square root of $E/\rho$ (rho), where E is the modulus of elasticity of the individual wire and $\rho$ is its density. Therefore, by a suitable selection of E and $\rho$, various combinations of these quantities can be found to produce widely different values of $E/\rho$ and hence of natural frequencies. As a result, the combination of strands cannot vibrate in unison without interacting forces between them, since when one strand is in resonance it must transmit a force to the other strand to make it vibrate. Accompanying these forces are relative motions between the strands of the combination. The result is rubbing friction and the energy, being dissipative, produces increased damping.

Various combinations of metals may be employed in this invention together with two or more strands for the makeup of the individual wires. Fig. 2 of this invention shows a grid wire composed of a strand of copper 4, nickel 5, and molybdenum 6, twisted together on the order of 10 turns to 18 inches of length, which provides good vibration damping characteristics. For this particular grid wire structure 7 the ratios of the square root of $E/\rho$ for copper, nickel and molybdenum are 1.34:1, 1.86, and 2.2 respectively. An example of the comparison of various grid wires is given in the following table by means of the logarithmic decrement, log $$\frac{\delta_1}{\delta_0}$$

where $\delta_1$ and $\delta_0$ are successive amplitudes of various sample wires examined at low pressure.

TABLE I

Logarithmic decrement measurements

[Length of wire 18″, load 1 gm., wire diameter 0.002″.]

| Description of Wire | Pressure (microns) | Logarithmic Decrement |
|---|---|---|
| 0.002″ dia. Cu, Ni, Mo 10 turns/18″_ | 60 | $1.33 \times 10^{-3}$ (average of three). |
| 0.002″ dia. Cu, Ni, Mo 100 turns/18″_ | 60 | $0.70 \times 10^{-3}$ (average of three). |
| 0.002″ Nichrome (single wire) | 60 | $0.38 \times 10^{-3}$ (one test). |

From the above table it may be seen that vibration damping characteristics as evidenced by the logarithmic decrement shows a four-fold change between the twisted wire with 10 turns and the solid wire. However, it is noted that for the 100 turn twisted wire the improvement is not as large due to the tighter twist or coupling between the three wires. It is sufficient therefore that the number of turns employed maintain the wire in close engagement or contiguous relationship and the maximum number of turns being such that a tightly twisted wire is avoided to thus permit relative motion between wires.

It was found during the course of the measurement for this type of wire that it was extremely difficult to find the resonant frequency in order to measure a damping coefficient. This is a result of a comparatively high logarithmic decrement, but also clearly indicates that the general frequency response would be sharply peaked at the resonance amplitude, and die off quickly. This represents a very advantageous situation since, unless the exciting frequency matched the resonant frequency rather closely, there would be no excitation, and in a grid of these wires many forces contributing to the wire vibration would no longer be considered exciting forces.

Fig. 3 illustrates one form of color kinescope tube 8 employing a grid 9 adjacent the inner face or screen portion 10. The grid 9 comprises a series of unidirectional wires 11 placed in a predetermined position or pattern. These wires may be cemented or otherwise joined to the glass of the tube 8 individually.

In Fig. 4 there is shown a grid structure 12 which comprises a series of unidirectional wires 11 maintained under a predetermined tension within a frame 13. The frame 13 may then be positioned in tube 8.

While specific embodiments of this invention have been shown and described, it is not desired that the invention be limited to the particular construction described, and it is intended by the appended claims to cover all modifications within the spirit and scope of this invention.

What I claim as new and desire to secure by Letters Patent of the United States is:

1. Vibration damping wire adapted to be stretched between spaced apart supports adjacent the face of a cathode ray tube and subjected to vibration comprising in combination, a plurality of individual wire strands, said wire strands being of dissimilar metal and of different natural frequencies of vibration when unidirectionally stretched between said spaced apart supports, and means to maintain said wire strands in external contiguous relationship throughout a length thereof, said contiguous relationship permitting relative movement between strands.

2. Vibration damping wire adapted to be unidirectionally stretched between spaced apart supports in electron discharge devices and subjected to vibration comprising in combination, a first strand of copper wire, a second strand of nickel wire, a third strand of molybdenum wire, and intertwining means of the strands to maintain said wires in contiguous relationship for a predetermined length thereof, said intertwining means permitting relative motion between strands.

3. A mask for color tubes comprising in combination, a tube having a face or screen portion, and a grid of free unidirectional wires adjacent the inner surface of said face, said grid wires each comprising a plurality of wire strands of dissimilar metal, the said wire being further characterized by having the individual strands twisted together for relative motion therebetween to provide inherent vibration damping characteristics.

4. The invention as claimed in claim 3 wherein said grid wires comprise individual equal diameter strands of copper wire, nickel wire, and molybdenum wire.

5. The invention as claimed in claim 3 wherein said grid wires are twisted together for a number of turns from that number sufficient to maintain said grid wired in engagement to about 10 in a length of approximately 18 inches.

6. The invention as claimed in claim 3 wherein said individual wire strands are twisted together on the order of about 10 to 100 turns per 18 inches of length.

References Cited in the file of this patent

UNITED STATES PATENTS

| | | |
|---|---|---|
| 1,478,087 | Wilson | Dec. 18, 1923 |
| 1,986,809 | Haffcke | Jan. 8, 1935 |
| 2,359,090 | Dyer | Sept. 26, 1944 |
| 2,477,279 | Anderson | July 26, 1949 |
| 2,486,436 | Rothstein | Nov. 1, 1949 |
| 2,612,581 | Robinson | Sept. 30, 1952 |
| 2,677,070 | Milligan | Apr. 27, 1954 |
| 2,757,303 | Silverman | July 31, 1956 |
| 2,778,870 | Nolan | Jan. 22, 1957 |